United States Patent
Jornod et al.

(10) Patent No.: US 11,751,077 B2
(45) Date of Patent: Sep. 5, 2023

(54) METHOD, COMPUTER PROGRAM, APPARATUS, AND VEHICLE FOR GENERATING A QUALITY OF SERVICE MAP

(71) Applicant: VOLKSWAGEN AKTIENGESELLSCHAFT, Wolfsburg (DE)

(72) Inventors: Guillaume Jornod, Berlin (DE); Richard Jacob, Fredersdorf (DE)

(73) Assignee: Volkswagen Aktiengesellschaft

( * ) Notice: Subject to any disclaimer, the term of this patent is extended or adjusted under 35 U.S.C. 154(b) by 149 days.

(21) Appl. No.: 17/205,544

(22) Filed: Mar. 18, 2021

(65) Prior Publication Data
US 2021/0297881 A1    Sep. 23, 2021

(30) Foreign Application Priority Data
Mar. 18, 2020 (EP) .................................. 20163932

(51) Int. Cl.
*H04W 24/08* (2009.01)
*H04W 4/029* (2018.01)
*H04L 41/5067* (2022.01)

(52) U.S. Cl.
CPC ......... *H04W 24/08* (2013.01); *H04L 41/5067* (2013.01); *H04W 4/029* (2018.02)

(58) Field of Classification Search
None
See application file for complete search history.

(56) References Cited

U.S. PATENT DOCUMENTS

2014/0310075 A1* 10/2014 Ricci .................. B60W 50/085
                                                              705/13
2015/0146514 A1*  5/2015 Mahimkar ........ H04W 72/0473
                                                              370/216

(Continued)

FOREIGN PATENT DOCUMENTS

EP              3614770 A1    2/2020
WO    WO-2006015427 A1 *  2/2006    ............ H04W 16/18
WO         2019006085 A1    1/2019

OTHER PUBLICATIONS

Jornod et al.; Packet Inter-Reception Time Modeling for High-Density Platooning in Varying Surrounding Traffic Density; 28th IEEE Eur. Conf. Net. Commun. (EuCNC); 2019; pp. 187-192.

(Continued)

*Primary Examiner* — Rebecca E Song
(74) *Attorney, Agent, or Firm* — BARNES & THORNBURG, LLP (57) ABSTRACT

A method, computer program, apparatus, and transportation vehicle for generating a quality of service (QoS) map. A radio link is used between a first and second mobile transceiver. The method includes determining information related to a density of mobile transceivers in an area surrounding the first mobile transceiver, information related to an availability of different radio access technologies (RATs) in the area surrounding the first mobile transceiver, and information related to a distance between the first and the second mobile transceivers; obtaining information related to a QoS of the radio link for the different RATs and determining a relationship between the information related to the density, the information related to the distance, and the information related to the QoS of the radio link for the different RATs; and storing the information related to the relationship for the different locations of the first mobile transceiver to obtain the QoS map.

26 Claims, 2 Drawing Sheets

(56) References Cited

U.S. PATENT DOCUMENTS

2015/0373565 A1* 12/2015 Safavi ................ H04L 41/5067
                                                              370/252
2016/0261516 A1*  9/2016 Gopinathan .......... H04L 47/127
2019/0174547 A1   6/2019 Khoryaev et al.
2019/0182841 A1*  6/2019 Soldati .............. H04W 72/0453
2019/0222491 A1   7/2019 Tomkins et al.
2020/0077278 A1   3/2020 Jornod et al.
2020/0314614 A1* 10/2020 Moustafa ................ H04L 67/34
2020/0374743 A1* 11/2020 Xin ..................... H04W 72/048
2021/0184943 A1*  6/2021 Jia ..................... H04W 28/0226

OTHER PUBLICATIONS

Search Report for European Patent Application No. 20163932.5; dated Oct. 8, 2020.

* cited by examiner

METHOD, COMPUTER PROGRAM, APPARATUS, AND VEHICLE FOR GENERATING A QUALITY OF SERVICE MAP

PRIORITY CLAIM

This patent application claims priority to European Patent Application No. 20163932.5, filed 18 Mar. 2020, the disclosure of which is incorporated herein by reference in its entirety.

SUMMARY

Illustrative embodiments relate to a method, a computer program, an apparatus, and a transportation vehicle for generating a quality of service (QoS) map, more specifically, but not exclusively, to a concept for efficiently predicting QoS for direct communication between users of a radio environment.

BRIEF DESCRIPTION OF THE DRAWINGS

Disclosed embodiments will be described by way of example only, and with reference to the accompanying figures, in which.

DETAILED DESCRIPTION

In the scope of cooperative driving, prediction of a future quality of service (QoS) may enable inter-vehicular application/communication when the QoS conditions vary in the radio environment. When no predictive QoS (pQoS) is provided an application can only react to variations and is therefore limited to lower bound performances of the communication system.

PQoS systems may rely on the vehicles/communication nodes with radio access technologies (RATs) such as LTE-V (Long Term Evolution-Vehicular) or 5G-V2X (5th Generation-Vehicle-to-Everything) in their standalone modes, or IEEE 802.11p (Institute of Electrical and Electronics Engineers). Combinations of these technologies can also be applied in multi-RAT systems. In such pQoS systems, transportation vehicles can exchange information about the surrounding communication environment to provide pQoS.

Document US 2019/0174547 A1 discloses systems and methods of providing RAT co-existence and congestion control in V2V (vehicle-to-vehicle) communications. A vUE (vehicular user equipment) detects specific non-LTE (Long Term Evolution) RAT transmissions in a listening period of a PSCCH or PSSCH (Physical Sidelink Control Channel or Physical Sidelink Shared Channel), determines whether a metric has been met and reselects to a non-overloaded channel to communicate with other vUEs or the eNB. The method of reselection is dependent on the RAT specific or V2X service priorities of the channels, as well as whether the channels are V2V service dependent.

Document WO 2019/006085 A1 describes systems, devices, and techniques for vehicle-to-anything-communications (V2X) using RATs. A communication associated with one or more of the multiple RATs may be received at a device. The device may include a transceiver interface with multiple connections to communicate with multiple transceiver chains. The multiple transceiver chains can be configured to support multiple RATs. Additionally, the multiple transceiver chains may be controlled via the multiple connections of the transceiver interface to coordinate the multiple RATs to complete the communication.

There is a demand for an improved concept for representing radio environment information.

Disclosed embodiments are based on the finding that a QoS map can be determined based on a density of mobile transceivers, available RATs in a vicinity of a mobile transceiver, and a distance between communicating mobile transceivers, their antenna, respectively. Based on QoSs determined for the different RATs, relationships between the mobile transceiver density, the distance and the RATs can be determined and stored. The stored relationships can then serve as a basis for predicting QoS for different constellations.

Disclosed embodiments provide a method for generating a QoS map. The QoS map comprises information related to a predicted QoS for a radio link at different locations of a first mobile transceiver. The radio link is used between the first mobile transceiver and a second mobile transceiver in a radio environment. The method comprises determining information related to a density of mobile transceivers in an area surrounding the first mobile transceiver, information related to an availability of different radio access technologies, RATs, in the area surrounding the first mobile transceiver, and information related to a distance between the first and the second mobile transceivers, their antennas, respectively. The method further comprises obtaining information related to a QoS of the radio link for the different RATs and determining a relationship between the information related to the density, the information related to the distance, and the information related to the QoS of the radio link for the different RATs. The method further comprises storing information related to the relationship for the different locations of the first mobile transceiver to obtain the QoS map. Disclosed embodiments may provide a sound basis for predicting QoS in a radio environment by generating a QoS map with relevant relationships between determining factors of QoS.

For example, the determining of the relationship may comprise modelling the relationship between the information related to the density, the information related to the distance, and the information related to the QoS of the radio link for the different RATs using statistical models or machine learning. Using statistical models or machine learning may enable efficient modelling of the relationship or of correlations determined before.

In some exemplary embodiments the statistical models or the machine learning may use at least one element of the group of a generalized linear regression, a general additive model, a multi-layer perceptron regression, and a Gaussian mixture. Disclosed embodiments may enable efficient modelling or implementation of prediction models.

The determining of the relationship may be further based on a location of the second mobile transceiver and the method may further comprise storing the relationship for different combinations of locations of the first and second mobile transceivers. The QoS map may comprise relations for a plurality of different constellations (locations and distances) in exemplary embodiments.

The method may further comprise predicting a QoS for a radio link between the first and second mobile transceivers.

Disclosed embodiments may enable reliable and efficient QoS prediction in a multi-RAT environment based on the QoS map with the relations.

In some exemplary embodiments the method further comprises receiving a request for predicting a QoS for a service from a requesting mobile transceiver. Disclosed embodiments may enable central QoS prediction, which can be used by a plurality of mobile transceivers to request pQoS for their service.

For example, the method may comprise evaluating a RAT or a RAT combination for the service, predicting a QoS for the RAT or the RAT combination based on the QoS map, and providing information related to the RAT or the RAT combination and the predicted QoS to the requesting mobile transceiver. Disclosed embodiments may evaluate efficient RAT selection or combination for service provision.

The area surrounding the first mobile transceiver may correspond to a geographical region. The QoS map may hence provide a mesh or grid of areas for which the relation is stored.

The determining of the relationship may be carried out for multiple different areas in exemplary embodiments to obtain a greater coverage of the QoS map.

In some exemplary embodiments the first and second mobile transceivers are transportation vehicles. Disclosed embodiments may enable efficient QoS prediction for inter-vehicle radio communication in a multi-RAT environment.

The information related to the density of mobile transceivers in the area surrounding the first mobile transceiver may comprise information related to a density of surrounding transportation vehicles in a cell model. The QoS map may be tailored to a traffic density and QoS prediction for vehicular applications such as platooning.

The information related to the availability of the different RATs in the area surrounding the first mobile transceiver may comprise information related to a penetration rate of RATs in a geographical region. The availability of the different RATs may be represented by a penetration rate in exemplary embodiments, which may reduce measurement efforts.

Disclosed embodiments further provide an apparatus for generating a QoS map. The QoS map comprises information related to a predicted QoS for a radio link at different locations of a first mobile transceiver. The radio link is established between the first mobile transceiver and a second mobile transceiver in a radio environment. The apparatus comprises one or more interfaces for communicating in the radio environment and a control module configured to carry out one of the methods described herein.

Another disclosed embodiment is a transportation vehicle comprising an exemplary embodiment of the apparatus.

Disclosed embodiments further provide a computer program having a program code for performing one or more of the described methods, when the computer program is executed on a computer, processor, or programmable hardware component. A further exemplary embodiment is a computer readable storage medium storing instructions which, when executed by a computer, processor, or programmable hardware component, cause the computer to implement one of the methods described herein.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted similarly.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" or "including", when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
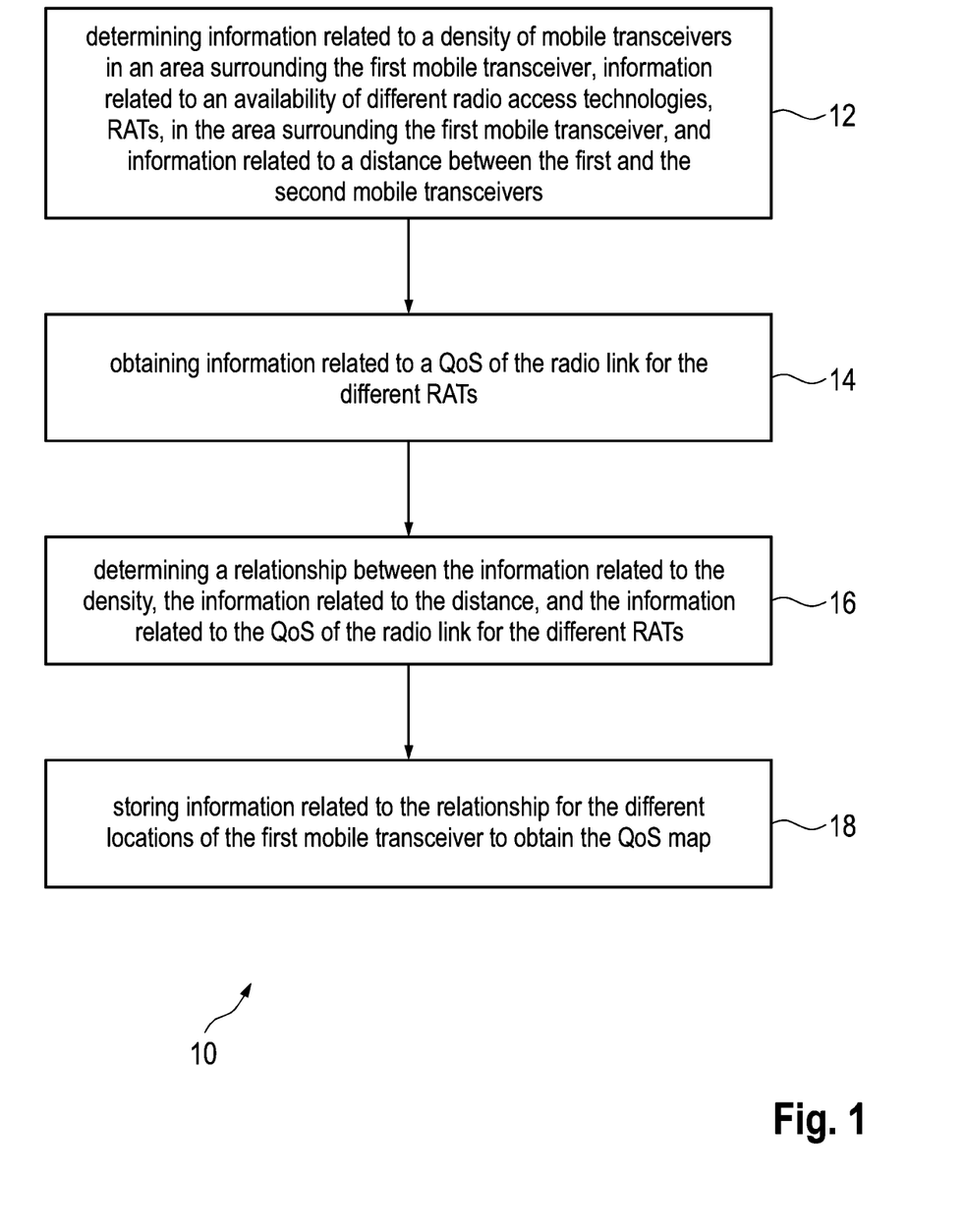
FIG. 1 illustrates a block diagram of an exemplary embodiment of a method for generating a quality of service map.

FIG. 1 illustrates a block diagram of an exemplary embodiment of a method 10 for generating a quality of service (QoS) map. The QoS map comprises information related to a predicted QoS for a radio link at different locations of a first mobile transceiver. The radio link is used or is established between the first mobile transceiver and a second mobile transceiver in a radio environment. The method comprises determining 12 information related to a density of mobile transceivers in an area surrounding the first mobile transceiver, information related to an availability of different radio access technologies, RATs, in the area surrounding the first mobile transceiver, and information related to a distance between the first and the second mobile transceivers, their antennas, respectively. The method 10 further comprises obtaining 14 information related to a QoS of the radio link for the different RATs and determining 16 a relationship between the information related to the density, the information related to the distance, and the information related to the QoS of the radio link for the different RATs. The method 10 further comprises storing 18 information related to the relationship for the different locations of the first mobile transceiver to obtain the QoS map.

Figure 2:
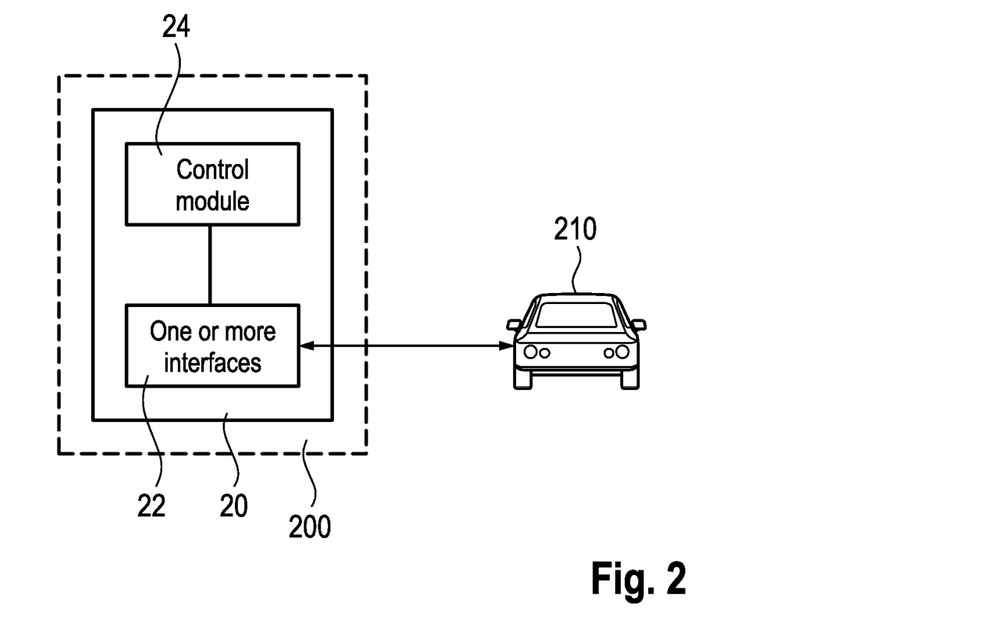
FIG. 2 illustrates a block diagram of an apparatus for generating a quality of service map.

FIG. 2 illustrates a block diagram of an apparatus 20 for generating a QoS map. The QoS map comprises information related to a predicted QoS for a radio link at different locations of a first mobile transceiver 200. The radio link is used between the first mobile transceiver 200 and a second mobile transceiver 210 in a radio environment. In the embodiment depicted in FIG. 2 the first mobile transceiver 200 and the second mobile transceiver 210 are exemplified as transportation vehicles. In further disclosed embodiments the first mobile transceiver 200 and the second mobile transceiver 210 may correspond to any user equipment in the radio environment. Moreover, in the exemplary embodiment shown in FIG. 2, the apparatus 20 is implemented in the first mobile transceiver 200. In other disclosed embodiments the apparatus 20 can be implemented in a server or any other infrastructure node of an overlaying mobile communication system or in the internet. The apparatus 20 comprises one or more interfaces 22 for communicating in the radio environment and a control module 24, which is coupled to the one or more interfaces 22, and which is configured to carry out one of the methods described herein. As mentioned above a transportation vehicle or a network component comprising an exemplary embodiment of the apparatus 20 are further disclosed embodiments. FIG. 2 also illustrates an exemplary embodiment of a mobile communication system 400, with the two mobile transceivers 200, 210.

The mobile transceivers may communicate in a radio environment offering different RATs or mobile communication systems. The different RATs may differ in their services and maximum QoS, respectively. In disclosed embodiments, QoS may comprise one or more elements of the group of, latency, data rate, error rate/reliability, packet error rate, packet inter-reception time, etc. Such QoS may depend on different factors, e.g., the RAT, pathloss, environment, interference situation, load, processing delay, etc.

To predict future service availability and QoS, it may be crucial to have a sound understanding of the radio environment. Typical properties of the radio environment may be pathloss, interference conditions, the load of a system, number of frequency carriers, a number of radio access technologies (RATs), etc. The more detailed a radio environment is modelled, the higher the amount of information that is needed for its classification. If information on a radio environment is communicated among transceivers of a mobile communication system, the amount of information needed to represent the radio environment contributes to a signaling load of the system. Disclosed embodiments may use an abstraction model, which allows to efficiently communicate and model a radio environment.

The apparatus 20 and the entities 200, 210 (e.g., mobile transceivers, transportation vehicles or network components) may communicate through one or more mobile communication systems or RATs. A mobile communication system or RAT may, for example, correspond to one of the Third Generation Partnership Project (3GPP)-standardized mobile communication networks, where the term mobile communication system is used synonymously to mobile communication network. Messages (e.g., input data, measured data, control information) may hence be communicated directly between mobile transceivers and/or through multiple network nodes (e.g., internet, router, switches, etc.) and the mobile communication system, which generates delay or latencies considered in exemplary embodiments.

The mobile or wireless communication system may correspond to a mobile communication system of the 5th Generation (5G, or New Radio) and may use mm-Wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

Service provision may be carried out by a network component, such as a base station transceiver, a relay station or a UE, e.g., coordinating service provision in a cluster or group of multiple UEs/vehicles. A base station transceiver can be operable or configured to communicate with one or more active mobile transceivers/vehicles and a base station transceiver can be located in or adjacent to a coverage area of another base station transceiver, e.g., a macro cell base station transceiver or small cell base station transceiver. Hence, disclosed embodiments may provide a mobile communication system comprising two or more mobile transceivers/vehicles 200 and one or more base station transceivers, wherein the base station transceivers may establish macro cells or small cells, as e.g., pico-, metro-, or femto cells. A mobile transceiver or UE may correspond to a smartphone, a cell phone, a laptop, a notebook, a personal computer, a Personal Digital Assistant (PDA), a Universal Serial Bus (USB)-stick, a car, a transportation vehicle, a road participant, a traffic entity, traffic infrastructure etc. A mobile transceiver may also be referred to as User Equipment (UE) or mobile in line with the 3GPP terminology.

A base station transceiver can be located in the fixed or stationary part of the network or system. A base station transceiver may be or correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a gNodeB, a Base Transceiver Station (BTS), an access point, a remote radio head, a relay station, a transmission point, etc., which may be further subdivided in a remote unit and a central unit.

A mobile transceiver or transportation vehicle 200, 210 can be associated with a base station transceiver or cell. The term cell refers to a coverage area of radio services provided by a base station transceiver, e.g., a NodeB (NB), an eNodeB (eNB), a gNodeB, a remote radio head, a transmission point, etc. A base station transceiver may operate one or more cells on one or more frequency layers, in some exemplary embodiments a cell may correspond to a sector. For example, sectors can be achieved using sector antennas, which provide a characteristic for covering an angular section around a remote unit or base station transceiver. In the following a cell may represent an according base station transceiver generating the cell or, likewise, a base station transceiver may represent a cell the base station transceiver generates.

The apparatus 20 may be comprised in a server, a base station, a NodeB, a UE, a relay station, or any service coordinating network entity in disclosed embodiments. It is to be noted that the term network component may comprise multiple sub-components, such as a base station, a server, etc.

In exemplary embodiments the one or more interfaces 22 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 22 may comprise further components to enable according communication in the mobile communication system, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 22 may be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field antenna, a field array, combinations thereof, etc. In some examples the one or more interfaces 22 may serve the purpose of transmitting or receiving or both, transmitting and receiving, information, such as information, input data, control information, further information messages, etc.

As shown in FIG. 2 the respective one or more interfaces 22 are coupled to the respective control module 24 at the apparatus 20. In disclosed embodiments the control module 24 may be implemented using one or more processing units, one or more processing devices, any method or mechanism for processing, such as a processor, a computer or a programmable hardware component being operable with accordingly adapted software. In other words, the described functions of the control module 24 may as well be implemented in software, which is then executed on one or more programmable hardware components. Such hardware components may comprise a general-purpose processor, a Digital Signal Processor (DSP), a micro-controller, etc.

In exemplary embodiments, communication, i.e., transmission, reception or both, may take place among mobile transceivers/vehicles 200 directly, e.g., forwarding input data or control information to/from a control center. Such communication may make use of a mobile communication system. Such communication may be carried out directly, e.g., by Device-to-Device (D2D) communication. Such communication may be carried out using the specifications of a mobile communication system. An example of D2D is direct communication between transportation vehicles, also referred to as Vehicle-to-Vehicle communication (V2V), car-to-car, Dedicated Short Range Communication (DSRC), respectively. Technologies enabling such D2D-communication include 802.11p, 3GPP systems (4G, 5G, NR and beyond), etc.

In disclosed embodiments, the one or more interfaces 22 can be configured to wirelessly communicate in the mobile communication system. To do so radio resources are used, e.g., frequency, time, code, and/or spatial resources, which may be used for wireless communication with a base station transceiver as well as for direct communication. The assignment of the radio resources may be controlled by a base station transceiver, i.e., the determination which resources are used for D2D and which are not. Here and in the following radio resources of the respective components may correspond to any radio resources conceivable on radio carriers and they may use the same or different granularities on the respective carriers. The radio resources may correspond to a Resource Block (RB as in LTE/LTE-A/LTE-unlicensed (LTE-U)), one or more carriers, sub-carriers, one or more radio frames, radio sub-frames, radio slots, one or more code sequences potentially with a respective spreading factor, one or more spatial resources, such as spatial sub-channels, spatial precoding vectors, any combination thereof, etc. For example, in direct Cellular Vehicle-to-Anything (C-V2X), where V2X includes at least V2V, V2-Infrastructure (V2I), etc., transmission according to 3GPP Release 14 onward can be managed by infrastructure (so-called mode 3) or run in a UE.

Disclosed embodiments may use an abstraction model for the representation of the surrounding communicating/active vehicles (radio environment). For example, in the scope of cooperative driving, the prediction of the future quality of service (QoS) enables vehicular application when the QoS conditions vary. Indeed, when no predictive QoS (PQoS) is provided, the application can only react to variations and is therefore limited to lower bound performances of the communication system.

PQoS systems can run on the transportation vehicles (apparatus 20), the communication nodes, with radio access technologies (RATs) such as LTE-V or 5G-V2X in their standalone modes, or IEEE 802.11p. Combinations of these technologies can also be applied in multi-RAT systems. In such PQoS systems, transportation vehicles can exchange information about the communication surrounding environment to provide PQoS. Disclosed embodiments may apply a channel model and statistical prediction to multiple RATs. In some exemplary embodiments the determining 16 of the relationship comprises modelling the relationship between the information related to the density, the information related to the distance, and the information related to the QoS of the radio link for the different RATs using statistical models or machine learning.

Disclosed embodiments may estimate a penetration rate of different RATs per geographical region and use it in the statistical model linking the transportation vehicle density with the estimated QoS affecting the link between a transmitter and a receiver (first and second mobile transceivers), which may both be transportation vehicles. The above-mentioned area surrounding the first mobile transceiver may correspond to the geographical region. The QoS map may hence be a grid of areas, a cell structure or any overlay of areas covering a geographical region.

In a further exemplary embodiment, the method 10 may comprise the following operations:
1. Gather information about the density of surrounding transportation vehicles in a cell model with, for example, rectangular or heptagonal or circular cells (e.g., on a 10 $m^2$, 20 $m^2$, 50 $m^2$, 100 $m^2$, 200 $m^2$, 500 $m^2$, 1000 $m^2$ scale). The information related to the density of mobile transceivers in the area surrounding the first mobile transceiver 200 may comprise information related to a density of surrounding transportation vehicles in a cell model;
2. Gather information about the penetration rate of technologies in the geographical region (country level, for instance), example IEEE 802.11p 40%, LTE-V 10%. The information related to the availability of the different RATs in the area surrounding the first mobile transceiver may comprise information related to a penetration rate of RATs in a geographical region;
3. Measure the distance between the transmitter and the receiver (first and second mobile transceivers, e.g., based on their locations), their antennas, respectively. The determining 16 of the relationship may be based on a location of the second mobile transceiver and the relationship may be stored for different combinations of locations of the first and second mobile transceivers;
4. Gather information about the QoS (per link: transmitter, receiver, RAT);
5. Model the relationship between the densities of surrounding transportation vehicles combined with the distance between transmitter and the receiver, their antennas, respectively, as well as the penetration rate to the link QoS using statistical models or machine learning such as Generalized Linear Regression, General Additive Model, Multi-Layer Perceptron regression, Gaussian mixtures. The statistical models or the machine learning may use at least one element of the group of a generalized linear regression, a general additive model, a multi-layer perceptron regression, and a Gaussian mixture;
6. Make multiRAT decision: selection or combination of technologies. Some exemplary embodiments may comprise predicting a QoS for a radio link between the first and second mobile transceivers. Such prediction may be carried out after receiving a request for predicting a QoS for a service from a requesting mobile transceiver. For example, if the method is carried out at an infrastructure network node, e.g., a base station or NodeB, mobile transceivers may request to be provided with pQoS for their service. pQoS determination may then be carried out upon request in the method 10. The multiRAT decision may further comprise evaluating a RAT or a RAT combination for the service, predicting a QoS for the RAT or the RAT combination based on the QoS map, and providing information related to the RAT or the RAT combination and the predicted QoS to the requesting mobile transceiver.

The above operations may be carried out for multiple cells or areas to obtain a map of relations. The method 10 may hence comprise determining the relationship for multiple different areas. Disclosed embodiments may avoid having to measure and disseminate the radio activity on each RAT since the stored relationships of the QoS relationship may allow prediction of QoS. Disclosed embodiments may avoid constant measuring and dissemination by using a priori knowledge on the penetration rate of the technologies in a traversed geographical region.

For example, a platoon of transportation vehicles is driving through an area with varying transportation vehicle densities. The platoon is equipped with multiple technologies. The platoon uses the multiple technologies to support its safety-related/time-related application. The platoon needs to estimate the channel quality (quality of service) to choose or combine its technologies, and, if the performance of the multiRAT system cannot meet its safety requirements, the platoon needs to change its functional settings, such as inter-vehicle distance. Each platoon member may run or contribute to the data collection operation (surrounding transportation vehicle densities, link information such as distance between the transceivers and multiRAT quality of service indicator).

The penetration rate of technologies can be known in advance or estimated with the received data. Each platoon member may then infer the relationship between the surrounding transportation vehicle densities, the distance between the transmitter and the receiver (their antennas, respectively) and the technologies penetration rate on one hand, and the measured quality of service.

In a further exemplary embodiment a learning phase is done through the collection of historical data, the modeling of the data and the training of the statistical model.

This data comprises the following information for each transmission:

Features (predictors): Timestamp, penetration rate of RAT1, . . . , penetration rate of RATn (n being an integer index), density of vehicles, inter-antenna distance (or inter-vehicle distance).

The targets are key performance indicators (KPI, e.g., KP1 is latency, KP2 is a maximum data rate, KP3 is error rate, etc.) for the different RATs, e.g., KPI1 on RAT1, . . . , KPI1 on RATn, KPIm on RAT1, . . . , KPIm on RATn, with n, m being integer numbers.

In an exemplary embodiment one model per combination of KPI & RAT may be determined. So, for KPI1 & RAT1, a model is determined yielding a function F:

$$F(\text{penetration rate of RAT1,density of vehicles,inter-antenna distance})=\text{KPI1}.$$

In a further modeling, $$P(\text{KPI1}<x)=K(x,F(\text{Penetration rate of RAT1,density of vehicles,inter-antenna distance}))$$

P(KPI1<x) is probability that KPI1 is lower than x.
where K is a probability distribution function. The last equation links the predictors (Penetration rate of RAT1, density of vehicle, inter-antenna distance) to the probability function K of KPI1.

For the packet inter-reception time, this function K can be an exponential distribution.

In an operational phase, the penetration rate of the RATs is obtained together with the density of surrounding transportation vehicles. Disclosed embodiments may then use the trained models to estimate the channel load/channel quality/transmission quality etc., depending on these pieces of information, and on the inter-antenna distance.

As already mentioned, in exemplary embodiments the respective methods may be implemented as computer programs or codes, which can be executed on a respective hardware. Hence, another disclosed embodiment is a computer program having a program code for performing at least one of the above methods, when the computer program is executed on a computer, a processor, or a programmable hardware component. A further disclosed embodiment is a computer readable storage medium storing instructions which, when executed by a computer, processor, or programmable hardware component, cause the computer to implement one of the methods described herein.

A person of skill in the art would readily recognize that operations of various above-described methods can be performed by programmed computers, for example, positions of slots may be determined or calculated. Herein, some exemplary embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The disclosed embodiments are also intended to cover computers programmed to perform the operations of methods described herein or (field) programmable logic arrays ((F)PLAs) or (field) programmable gate arrays ((F)PGAs), programmed to perform the operations of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed to furthering the art and are to be construed as being without limitation to such specifically recited examples and conditions. Moreover, all statements herein reciting principles and embodiments of the disclosure, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate disclosed embodiment. While each claim may stand on its own as a separate disclosed embodiment, it is to be noted that—although a dependent claim may refer in the claims to a specific combination with one or more other claims—other exemplary embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having methods or mechanisms for performing each of the respective operations of these methods.

LIST OF REFERENCE SIGNS 10 method for generating a quality of service map
12 determining information related to a density of mobile transceivers in an area surrounding the first mobile transceiver, information related to an availability of different radio access technologies, RATs, in the area surrounding the first mobile transceiver, and information related to a distance between the first and the second mobile transceivers
14 obtaining information related to a QoS of the radio link for the different RATs
16 determining a relationship between the information related to the density, the information related to the distance, and the information related to the QoS of the radio link for the different RATs indicating an activity of the one or more active transceivers per cell in the grid
18 storing the information related to the relationship for the different locations of the first mobile transceiver to obtain the QoS map
20 apparatus for generating a quality of service map
22 one or more interfaces
24 control module
200 first mobile transceiver
210 second mobile transceiver
400 mobile communication system

The invention claimed is:

1. An apparatus for generating a Quality of Service (QoS) map, the QoS map including predicted radio link QoS information at a plurality of different locations of a first mobile transceiver, the radio link being between the first mobile transceiver and a second mobile transceiver in a radio environment that includes a plurality of different Radio Access Technologies (RATs), the apparatus comprising:
  one or more interfaces for communicating in the radio environment; and
  a control module configured to generate the QoS map by:
    determining density information indicating a density of mobile transceivers in an area surrounding the first mobile transceiver, availability information indicating availability of each of the plurality of different Radio Access Technologies (RATs) in the area surrounding the first mobile transceiver, and distance information indicating a distance between the first and the second mobile transceivers;
    obtaining radio link QoS information indicating a QoS of the radio link for each of the plurality of different RATs;
    associating the density information, the distance information, and the radio link QoS information; and
    storing the associated information for the plurality of different locations of the first mobile transceiver to generate the QoS map,
    wherein the first and second mobile transceivers are multiRAT devices and the associated information of the generated QoS map provides data indicating predicted QoS for the radio link between the first and second mobile transceivers based on selection of one or more RATs to implement the radio link using the multiRAT devices.

2. The apparatus of claim 1, wherein the associating includes modelling a relationship among the density information, the distance information, and the radio link QoS information for the different RATs using statistical models or machine learning.

3. The apparatus of claim 2, wherein the statistical models or the machine learning use at least one element of the group that includes a generalized linear regression, a general additive model, a multi-layer perceptron regression, and a Gaussian mixture.

4. The apparatus of claim 2, wherein the associating is based on a location of the second mobile transceiver, wherein the control module is further configured to store the relationship for different combinations of locations of the first and second mobile transceivers.

5. The apparatus of claim 1, wherein the control module is further configured to predict a QoS for the radio link between the first and second mobile transceivers.

6. The apparatus of claim 1, wherein the control module is further configured to control the one or more interfaces to receive a request for predicting a QoS for a service from a requesting mobile transceiver.

7. The apparatus of claim 6, wherein the control module is further configured to evaluate a RAT or a RAT combination for the service, predicting a QoS for the RAT or the RAT combination based on the QoS map, and providing information related to the RAT or the RAT combination and the predicted QoS to the requesting mobile transceiver.

8. The apparatus of claim 1, wherein the area surrounding the first mobile transceiver corresponds to a geographical region.

9. The apparatus of claim 1, wherein the control module is further configured to performing the associating for multiple different areas.

10. The apparatus of claim 1, wherein the first and second mobile transceivers are transportation vehicles.

11. The apparatus of claim 10, wherein the density information comprises density information indicating a density of surrounding transportation vehicles in a cell model.

12. The apparatus of claim 1, wherein the availability information comprises information indicating a penetration rate of each of the plurality of RATs in a geographical region.

13. A transportation vehicle comprising the apparatus of claim 1.

14. A method for generating a Quality of Service (QoS) map, the QoS map including predicted radio link QoS information at a plurality of different locations of a first mobile transceiver, the radio link being between the first mobile transceiver and a second mobile transceiver in a radio environment that includes a plurality of different Radio Access Technologies, the method comprising:
    determining density information indicating a density of mobile transceivers in an area surrounding the first mobile transceiver, availability information indicating an availability of different Radio Access Technologies (RATs) in the area surrounding the first mobile transceiver, and distance information indicating a distance between the first and the second mobile transceivers;
    obtaining radio link QoS information indicating a QoS of the radio link for each of the plurality of different RATs;
    associating the density information, the distance information, and the radio link QoS information; and
    storing the associated information for the plurality of different locations of the first mobile transceiver to generate the QoS map,
    wherein the first and second mobile transceivers are multiRAT devices and the associated information of the generated QoS map provides data indicating predicted QoS for the radio link between the first and second mobile transceivers based on selection of one or more RATs to implement the radio link using the multiRAT devices.

15. The method of claim 14, wherein the associating includes modelling a relationship among the density information, the distance information, and the radio link QoS information for the different RATs using statistical models or machine learning.

16. The method of claim 15, wherein the statistical models or the machine learning use at least one element of the group that includes a generalized linear regression, a general additive model, a multi-layer perceptron regression, and a Gaussian mixture.

17. The method of claim 15, wherein the associating is performed based on a location of the second mobile transceiver, wherein the method further comprises storing the relationship for different combinations of locations of the first and second mobile transceivers.

18. The method of claim 14, further comprising predicting a QoS for the radio link between the first and second mobile transceivers.

19. The method of claim 14, further comprising receiving a request for predicting a QoS for a service from a requesting mobile transceiver.

20. The method of claim 19, further comprising evaluating a RAT or a RAT combination for the service, predicting a QoS for the RAT or the RAT combination based on the QoS map, and providing information related to the RAT or the RAT combination and the predicted QoS to the requesting mobile transceiver.

21. The method of claim 14, wherein the area surrounding the first mobile transceiver corresponds to a geographical region.

22. The method of claim 14, further comprising performing the associating for multiple different areas.

23. The method of claim 14, wherein the first and second mobile transceivers are transportation vehicles.

24. The method of claim 23, wherein the density information comprises information indicating a density of surrounding transportation vehicles in a cell model.

25. The method of claim 14, wherein the availability information comprises information indicating a penetration rate of each of the plurality of RATs in a geographical region.

26. A non-transitory computer readable medium that includes a computer program having a program code for performing the method of claim 14, when the computer program is executed on a computer, a processor, or a programmable hardware component.

* * * * *